(12) United States Patent
Bower et al.

(10) Patent No.: US 7,886,187 B2
(45) Date of Patent: Feb. 8, 2011

(54) SYSTEM FOR REPEATED UNMOUNT ATTEMPTS OF DISTRIBUTED FILE SYSTEMS

(75) Inventors: Carlie Sue Bower, Austin, TX (US); Saurabh Kumar Gupta, Karnataka (IN); Avanish Kumar Ojha, Karnataka (IN); Muthulaxmi Pearl Srinivasan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 12/124,353

(22) Filed: May 21, 2008

(65) Prior Publication Data

US 2009/0292957 A1     Nov. 26, 2009

(51) Int. Cl.
*G06F 11/00* (2006.01)
(52) U.S. Cl. .......................................... 714/24; 714/17
(58) Field of Classification Search ................ 714/8, 714/17, 24; 707/822, 827
See application file for complete search history.

(56) References Cited

U.S. PATENT DOCUMENTS

| | | | |
|---|---|---|---|
| 7,051,198 B2 | 5/2006 | Cabrera et al. | |
| 7,120,650 B2 * | 10/2006 | Loy et al. | 1/1 |
| 7,207,033 B2 * | 4/2007 | Kung et al. | 717/106 |
| 7,690,033 B2 * | 3/2010 | Pernia | 726/16 |
| 2002/0049923 A1 * | 4/2002 | Kanazawa et al. | 714/5 |
| 2004/0107342 A1 * | 6/2004 | Pham et al. | 713/165 |
| 2004/0107422 A1 * | 6/2004 | Cabrera et al. | 719/310 |
| 2006/0074940 A1 * | 4/2006 | Craft et al. | 707/100 |
| 2006/0282471 A1 * | 12/2006 | Mark et al. | 707/200 |
| 2008/0022410 A1 | 1/2008 | Diehl | |
| 2008/0155316 A1 * | 6/2008 | Pawar et al. | 714/8 |

* cited by examiner

*Primary Examiner*—Joshua A Lohn
(74) *Attorney, Agent, or Firm*—David A. Mims; Robert C. Rolnik

(57) ABSTRACT

The present invention provides a computer implemented method and apparatus for unmounting file systems from a plurality of file servers. The method comprises of issuing an unmount command targeting a file system of a first server among the plurality of file servers. The timeout period is then expired without receiving an unmount acknowledgement associated with the unmount command. Thus, the timeout period is associated with an allowable time for the file system to acknowledge unmounting. In response to expiring the timeout period, a ping is transmitted to the first server among the plurality of file servers. The ping timeout then expires based on a failure to receive a ping acknowledgment corresponding to the ping. This action marks the first server for a later retry of unmounting to form a marked set based on the first server.

20 Claims, 2 Drawing Sheets

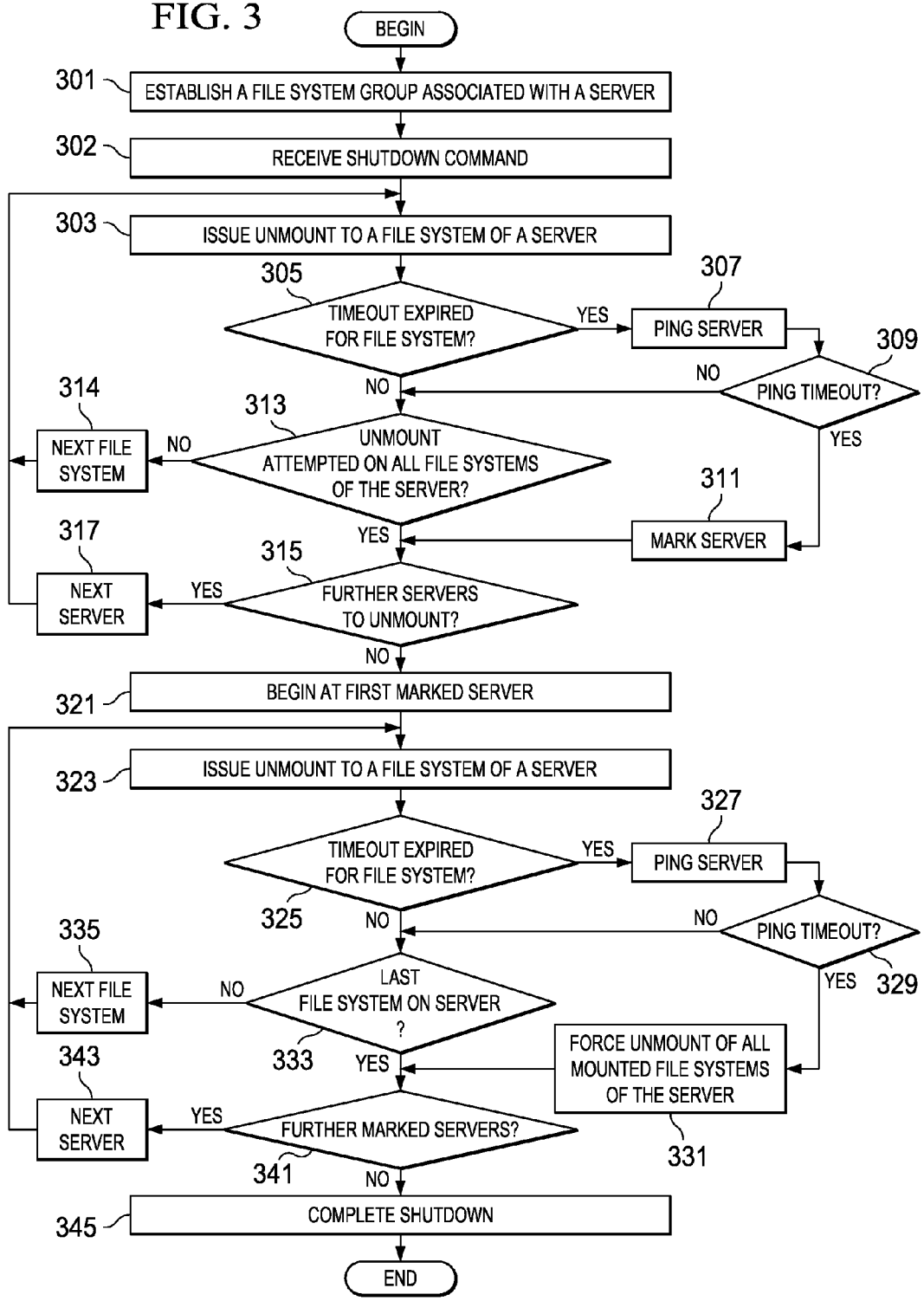

SYSTEM FOR REPEATED UNMOUNT ATTEMPTS OF DISTRIBUTED FILE SYSTEMS

BACKGROUND OF THE INVENTION

1. Field of the Invention

The present invention relates generally to a computer implemented method, data processing system, and computer program product for robust unmounting of file systems from a client data processing system. More specifically, the present invention relates to recurring unmounts of a file system, prior to forcing a file system to unmount, if necessary.

2. Description of the Related Art

Architects of modern data centers have found a way to build flexible storage for data that permits scaling addressable storage. One way to build such a data center is to implement network file systems, for example, Network File System (NFS). A file system is an apparatus for organizing files and associated metadata to enable access of such files and metadata within non-volatile storage, such as, for example, hard disk drives. Such systems may be based on Request For Comments (RFC) 1094, RFC 1813, RFC 3010, RFC 3530, for example. Among the benefits established for such systems is the ability to present disk stores located on a network to a client machine in a manner as though such disk stores were locally attached to the client machine.

Typically, when a client data processing system boots up, the client mounts disk stores in accordance with a file systems table or fstab (also known as file structure table). In complex systems, the client may have over a hundred disk stores so mounted. These disk stores, as well as other permanent storage, can be written to, but at a slower rate than memory local to the client data processing system. Accordingly, disk stores, and the file systems that they support, can respond sluggishly, particularly when disk writes are finalized prior to shutting down.

Among the tasks assigned to administrators of a system, is the task to perform routine maintenance, repair and upgrades. Accordingly, the client system may require rebooting or even shutting down. Delays in shutting down can occur because of complex associations with remote file systems using a Network File System (NFS). For example, a server that hosts one or more file systems for a client may be down for repairs or otherwise unreachable over a network. A server is a data processing system that processes data in response to requests by other data processing systems or clients. A client, in this example, is a data processing system that makes requests to process data to a server.

NFS clients rely on block storage devices implemented as file systems. A block storage device can be a hard drive or other storage device. Such computers rely on a system of performing preliminary writes of data to long-latency storage by buffering one or more write results to memory, and then triggering a complete transfer of the data from memory to the storage in a single action. This method accomplishes some efficiency, but can leave data susceptible to data corruption if the storage is disconnected or unavailable from the memory. System architects use a mechanism to obtain a consistent state between disk writes and disk reads buffered in a system's volatile memory and the host block device. One such mechanism is the flush command. A flush command instructs a data processing system to write completely any data of a read/write buffer to disk or other storage. Accordingly, a client computer can shutdown or otherwise disconnect at such that the state of the client computer matches the state of a supporting, but remote file system.

Prior art shutdown techniques of a client involved unmounting each file system in sequence, always waiting for a previously commanded unmount to be acknowledged by a server prior to issuing a further unmount command to the server. Even in cases where an acknowledgement was not received within a reasonable timeout period, the client would repeat unmount commands for a subsequent file system hosted on a server that previously was unresponsive. Often repeated conventional unmount commands are unproductive, and can prolong the shutdown of a client.

Accordingly, it can be helpful for a client to discover and avoid an unresponsive server.

SUMMARY OF THE INVENTION

The present invention provides a computer implemented method and apparatus for unmounting file systems from a plurality of file servers. The method comprises of issuing an unmount command targeting a file system of a first server among the plurality of file servers. The timeout period is then expired without receiving an unmount acknowledgement associated with the unmount command. Thus, the timeout period is associated with an allowable time for the file system to acknowledge unmounting. In response to expiring the timeout period, a ping is transmitted to the first server among the plurality of file servers. The ping timeout then expires based on a failure to receive a ping acknowledgment corresponding to the ping. This action marks the first server for a later retry of unmounting to form a marked set based on the first server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart of steps to unmount file systems in accordance with an illustrative embodiment of the invention.

DETAILED DESCRIPTION OF THE PREFERRED EMBODIMENT

Figure 1:
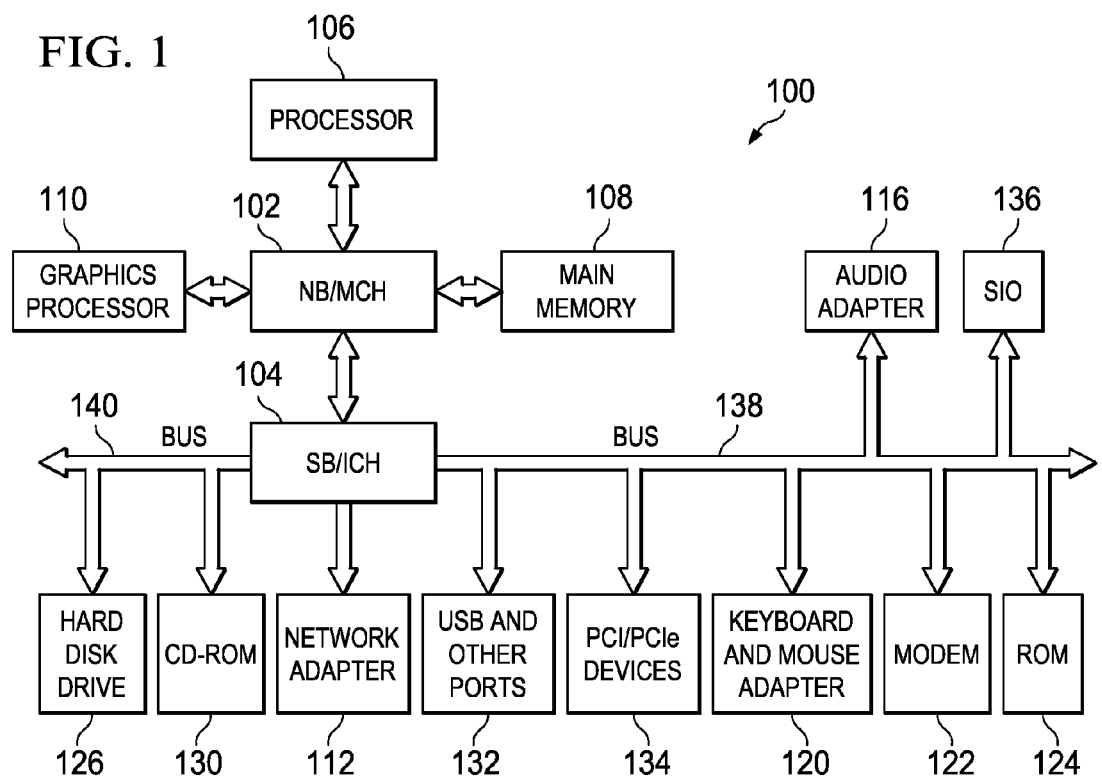
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for concluding disk accesses on a Networking File System (NFS) store, for example, in response to shutting down a client. A feature of such a system can be to perform a ping of a suspect server in response to a failure to receive an acknowledgement of completed disk writes within an allowable time. Accordingly, further attempts to unmount file systems from such a server may be suspended until other servers have been requested to unmount their respectively served file systems. If a marked server is dead or unresponsive during a later retry, the system may force an unmount of all the file systems mounted on that marked server.

Figure 2:
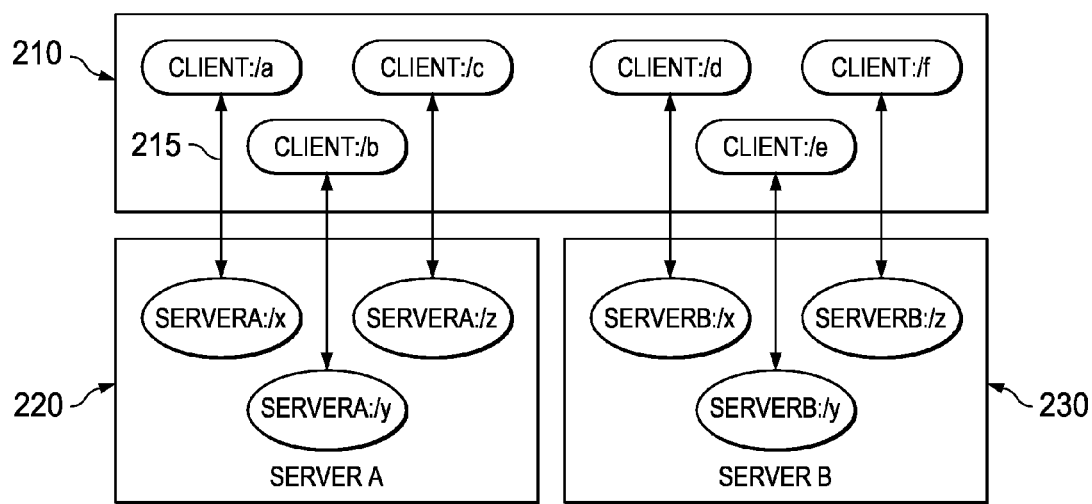
FIG. 2 is a logical diagram of mounted file systems to locally named directory in accordance with an illustrative embodiment of the invention.

FIG. 2 is a logical diagram of mounted file systems to locally named directories in accordance with an illustrative embodiment of the invention. Client 210 supports locally named directories, such as client:/a, client:/b; client:/c, client:/d, client:/e, and client:/f. Directories client:/a, client:/b, and client:/c are coupled by a mount procedure to the file systems of server A 220, in this case, server A:/x, server A:/y, and server A:/z, respectively. Similarly, directories client:/d, client:/e, client:/f are coupled by a mount procedure to the file systems of server B 230, in this case server B:/x, server B:/y and server B:/z, respectively. In such a configuration, the file systems of server A:/x, server A:/y, and server A:/z, may be grouped together. Since each file system is dependent on common hardware elements, there is a strong correlation between the availability of one such file system being available and another file system of the group being available. It is appreciated that the configuration of FIG. 2 is only an example. In addition to server A 220 and server B 230, additional servers may form a plurality of file servers.

The coupling between directory and file system may be via a network. Such a network may be wired or wireless. Similarly, there may be local segments to the network, as well as remote segments. Such interconnect is simplified in FIG. 2 by showing a single logical link between a directory and the file system that supports the directory. For example, link 215 supports commands to mount and unmount server A:/x along a path from client:/a to server A:/x. An unmount command is a command issued by a client that requests write buffers of the client to actually be written to the corresponding file system hosted by the server. As a result, the logical link can be closed gracefully. By gracefully, it is meant that the contents of data at each end of the logical link are kept in a relatively uncorrupted and consistent state. As such, the unmount command targets a file system of a server.

Similarly, responses and acknowledgments, if any, are passed the opposite direction along a path from server A:/x to directory client:/a. One such acknowledgment is the unmount acknowledgement. An unmount acknowledgment is an acknowledgment that a server transmits to a client to indicate that an unmount command has completed successfully. Unmount acknowledgments can be blocked by a number of issues. For example, the server may suffer a failure between the receipt of the unmount command and the dispatch of an unmount acknowledgement. As another example, the server may be disconnected from the client, and the unmount command, though sent, may be unable to traverse a network to reach the client. Accordingly, the unmount command may fail to reach the client during an allowable time for the file system to acknowledge unmounting. An allowable time for a file system to acknowledge unmounting is a time established by default or by a system administrator as a system tunable. For example, a system administrator may choose to set the allowable time for a file system to acknowledge unmounting to 20 seconds.

FIG. 3 is a flowchart of steps to unmount file systems in accordance with an illustrative embodiment of the invention. Initially, a system administrator of a client establishes file system groups associated with a server (step 301). Consequently, the client receives a database or data entries that show a correlation of one or more file systems to a server or host. As a result, the client forms a file system group that lists or otherwise stores the file systems mounted from the server for the client.

Next, the client may receive a shutdown command (step 302). A shutdown command is a shutdown command used to cause a data processing system to shutdown or reboot. A data processing system can be, for example, data processing system 100 of FIG. 1, and may host Unix-like operating systems such as, AIX®, Linux®, and Unix®. AIX is a registered trademark of International Business Machines, Corp. Linux is a registered trademark of Linus Torvalds. UNIX is a registered trademark of The Open Group.

Next, the shutdown command may issue an unmount command to a file system of the server (step 303). Such a file system may be selected from a file system group of file systems supported by the server for the client. The server may be among a plurality of servers, as depicted, for example, in FIG. 2. Next, the client may determine whether a timeout period has expired without receiving an unmount acknowledgment associated with the unmount command given in step 303. Thus, the client determines whether the timeout period expired for the file system (step 305). A timeout period is a time measured contemporaneously from a triggering event to an expected reply time. The timeout period can be based on an allowable time, wherein the interval from expected reply time to triggering event is the allowable time.

Though not depicted in FIG. 3, an illustrative embodiment may be implemented such that the client repeats steps 303 and 305 a configurable number of times so that the client may repeat a reasonable number of normal unmount attempts before moving forward. Accordingly, an administrator of the client may adjust for a quicker marking of the server by setting the configurable number low, or adjust for a lengthier series of attempts by setting the configurable number higher. By 'normal' unmount, it is meant that the client attempts to flush all the buffered data to the server system and wait for an acknowledgement for the flushed data. In contrast, a forced unmount is where the client does not attempt to flush buffered data.

A positive determination to step 305 causes the client to transmit a ping to the server (step 307). The ping may be an Internet Control Message Protocol (ICMP) ping as defined by Request For Comments (RFC) 792, RFC 1122, and related standards. Accordingly, the client may wait for a ping acknowledgment. The client may determine whether the ping acknowledgement fails to arrive before the ping timeout (step 309). A ping acknowledgment is a packet that is returned by a server to the client. Such a ping acknowledgment may be an echo reply message.

A positive determination to step 309 results in the client marking the server for later retry of unmounting. Such a positive determination occurs when the ping timeout expires. Thus, the client marks the server (step 311). Step 311 may include forming a marked set based on the server. A marked set is a data structure that includes references to each server known to have failed to respond in time to both an unmount command as well as a ping. Thus, the marked set may be later retried during a subsequent unmount command without imposing unnecessary delays to additional servers that support file systems for the client. The process continues with a query of further servers to unmount (step 315).

However, if either step 305 or step 309 have negative results, the client may determine if, for the server targeted in step 303, an unmount has been attempted on the all file systems on the server (step 313). A negative determination to step 313 causes the client to select a next file system of the server for further action (step 314). Consequently, further iterations of steps 303-309 may be possible while targeting one or more remaining file systems of the file system group.

As a result of a positive determination to step 313, or following step 311, the client may determine if further servers remain to unmount (step 315). By further servers, it is meant that further servers exist if there are servers that provide at least one file system to the client, but such servers have not been the target of an attempt to unmount during the process following step 302. A positive determination causes the client to select the next server (step 317). For example, in FIG. 2, after concluding an initial attempt to unmount a file system of server A 220, client 210, may continue with attempts to unmount a file system of server B 230. Further processing may resume at step 303.

At some point, there are no further servers remaining that have not been targeted by at least one unmount command at step 303. Thus, a negative determination to step 315 may trigger a second phase of steps. Consequently, the client may renew attempts to unmount file systems by beginning at the first marked server (step 321). The first marked server may be a server within the marked set.

Next, the client may issue an unmount command to a file system of the server (step 323). The unmount command may be a retry unmount command in the sense that the retry unmount command is a second unmount command issued to a particular file system of the server that supports the client. The client may subsequently determine if a timeout has expired for the file system to acknowledge the unmount command (step 325). If the file system fails to acknowledge the unmount command in a predetermined time, the outcome to step 325 is positive. The predetermined time may be based on the allowable time used in step 305. In response to a failure to acknowledge the unmount command within a predetermined time, the client transmits a ping to the server (step 327). Next, the client may determine if the ping timeout expires (step 329). A ping timeout expiration causes the client to force an unmount of all mounted file systems of the server (step 331). A forced unmount may be performed using a command line of "unmount—f<device>", where '<device>' may be substituted with a description of the targeted device or directory within a particular server or client. During a forced unmount, the client discards all the buffered data and without waiting for an acknowledgement from the server. All mounted file systems of the server are those file systems that have not yet been unmounted. After step 331, the client continues at step 341, explained below.

Following negative outcomes to steps 325 and 329, the client determines if the file system targeted in step 323 was the last file system on the server (step 333). If not, the client obtains the next file system (step 335). Next, the client may continue with step 323 using the file system selected in step 335.

However, if the outcome to step 333 is positive, the client may determine if there are further marked servers (step 341). If there are further marked servers, the client obtains the next server (step 343). Accordingly, the client repeats step 323, and one or more subsequent steps based on the server selected in step 323.

At some time, the outcome to step 341 is negative, that is, there are no further marked servers that have not received a second unmount request at least once at step 323. Accordingly, the client performs a complete shutdown (step 345). A complete shutdown may be among the steps a client performs when rebooting. The process terminates thereafter.

The illustrative embodiments permit shutdown or reboot of a client that relies on networked availability of file systems. A server that is slow to respond or is non-responsive does not bottleneck the shutdown process more than is reasonable. Rather, a server that is slow to respond, is retried after any additional supporting servers are targeted with an unmount command. Thus, such responsive servers may have an earlier opportunity to unmount and speed the graceful shutdown of the client.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for unmounting file systems of a plurality of file servers, the method comprising:
issuing an unmount command targeting a file system of a first server among the plurality of file servers;
expiring a timeout period without receiving an unmount acknowledgement associated with the unmount command, the timeout period associated with an allowable time for the file system to acknowledge unmounting;
responsive to expiring the timeout period, transmitting a ping to the first server among the plurality of file servers;
responsive to transmitting the ping, expiring a ping timeout based on a failure to receive a ping acknowledgment corresponding to the ping; and
responsive to expiring the ping timeout, marking the first server for later retry of unmounting to form a marked set based on the first server.

2. The computer implemented method of claim 1, further comprising:
grouping all file systems mounted from the first file server in support of a client to form a first file system group prior to issuing the at least one unmount command; and
receiving a shutdown command, wherein the unmount command targets the file system and the file system is among the file systems mounted on the first server.

3. The computer implemented method of claim 2, further comprising:
responsive to marking the first server for later retry of unmounting, selecting a second server for unmounting; and
responsive to marking the first server for later retry of unmounting, issuing an unmount command targeting a second file system of the second server among the plurality of file servers.

4. The computer implemented method of claim 3, further comprising:
issuing a retry unmount command to the first server, wherein the unmount command targeting the second file system occurs prior to issuing the retry unmount command;
expiring a second timeout period associated with the predetermined time;
responsive to expiring the second timeout period, transmitting a second ping to the first server;
expiring a second ping timeout period associated with the second ping; and
responsive to expiring the second ping timeout period, forcing an unmount of all mounted file systems of the first file system group.

5. The computer implemented method of claim 3, further comprising:
issuing a retry unmount command to the first server;
receiving an unmount acknowledgement associated with the retry unmount command before expiring a retry unmount timeout period; and
responsive to receiving the unmount acknowledgement, issuing an unmount command targeting an additional file system of the first server.

6. The computer implemented method of claim 5, wherein issuing the retry unmount command is performed responsive to issuing at least one unmount command to each one of the plurality of file servers.

7. The computer implemented method of claim 6, wherein issuing the unmount command targeting the file system is responsive to receiving the shutdown command; and responsive to issuing a retry unmount command to each server of the marked set, shutting down.

8. A computer program product for unmounting file systems of a plurality of file servers, the computer program product comprising a computer usable storage device medium having computer usable program code embodied therewith, the computer program product comprising:

computer usable program code configured to issue an unmount command targeting a file system of a first server among the plurality of file servers;

computer usable program code configured to expire a timeout period without receiving an unmount acknowledgement associated with the unmount command, the timeout period associated with an allowable time for the file system to acknowledge unmounting;

computer usable program code configured to transmit a ping to the first server among the plurality of file servers, responsive to expiring the timeout period;

computer usable program code configured to expire a ping timeout based on a failure to receive a ping acknowledgment corresponding to the ping, responsive to transmitting the ping; and computer usable program code configured to mark the first server for later retry of unmounting to form a marked set based on the first server, responsive to expiring the ping timeout.

9. The computer program product of claim 8, further comprising:

computer usable program code configured to group all file systems mounted from the first file server in support of a client to form a first file system group prior to issuing the at least one unmount command; and computer usable program code configured to receive a shutdown command, wherein the unmount command targets the file system and the file system is among the file systems mounted on the first server.

10. The computer program product of claim 9, further comprising:

computer usable program code configured to select a second server for unmounting, responsive to marking the first server for later retry of unmounting; and computer usable program code configured to issue an unmount command targeting a second file system of the second server among the plurality of file servers, responsive to marking the first server for later retry of unmounting.

11. The computer program product of claim 10, further comprising:

computer usable program code configured to issue a retry unmount command to the first server, wherein the unmount command targeting the second file system occurs prior to issuing the retry unmount command;

computer usable program code configured to expire a second timeout period associated with the predetermined time;

computer usable program code configured to transmit a second ping to the first server, responsive to expiring the second timeout period;

computer usable program code configured to expire a second ping timeout period associated with the second ping; and computer usable program code configured to force an unmount of all mounted file systems of the first file system group, responsive to expiring the second ping timeout period.

12. The computer program product of claim 11, further comprising:

computer usable program code configured to issue a retry unmount command to the first server;

computer usable program code configured to receive an unmount acknowledgement associated with the computer usable program code configured to retry unmount command before expiring a retry unmount timeout period; and computer usable program code configured to issue an unmount command targeting an additional file system of the first server, responsive to receiving the unmount acknowledgement.

13. The computer program product of claim 12, wherein computer usable program code configured to issue the retry unmount command is performed responsive to issuing at least one unmount command to each one of the plurality of file servers.

14. The computer program product of claim 13, computer usable program code configured to issue the unmount command targeting the file system is responsive to receiving the shutdown command; and computer usable program code configured to shut down, responsive to issuing a retry unmount command to each server of the marked set.

15. A data processing system comprising:

a bus;

a storage device connected to the bus, wherein computer usable code is located in the storage device;

a communication unit connected to the bus;

a processing unit connected to the bus, wherein the processing unit executes the computer usable code for unmounting file systems of a plurality of file servers, wherein the processing unit executes the computer usable program code to issue an unmount command targeting a file system of a first server among the plurality of file servers; expire a timeout period without receiving an unmount acknowledgement associated with the unmount command, the timeout period associated with an allowable time for the file system to acknowledge unmounting; responsive to expiring the timeout period, transmit a ping to the first server among the plurality of file servers; responsive to transmitting the ping, expire a ping timeout based on a failure to receive a ping acknowledgment corresponding to the ping; and responsive to expiring the ping timeout, mark the first server for later retry of unmounting to form a marked set based on the first server.

16. The data processing system of claim 15, wherein the processor further executes computer usable code to group all file systems mounted from the first file server in support of a client to form a first file system group prior to issuing the at least one unmount command; and to receive a shutdown command, wherein the unmount command targets the file system and the file system is among the file systems mounted on the first server.

17. The data processing system of claim 16, wherein the processor further executes computer usable code to select a second server for unmounting, responsive to marking the first server for later retry of unmounting; and issue an unmount command targeting a second file system of the second server among the plurality of file servers, responsive to marking the first server for later retry of unmounting.

18. The data processing system of claim 17, wherein the processor further executes computer usable code to issue a retry unmount command to the first server, wherein the unmount command targeting the second file system occurs prior to issuing the retry unmount command; expire a second timeout period associated with the predetermined time; transmit a second ping to the first server, responsive to expiring the second timeout period; expire a second ping timeout period associated with the second ping; and force an unmount of all mounted file systems of the first file system group, responsive to expiring the second ping timeout period.

19. The data processing system of claim 18, wherein the processor further executes computer usable code to issue a retry unmount command to the first server; receive an unmount acknowledgement associated with the retry unmount command before expiring a retry unmount timeout period; and issue an unmount command targeting an additional file system of the first server, responsive to receiving the unmount acknowledgement.

20. The data processing system of claim 19, wherein in executing computer usable program code to issue, the processing unit executes the computer usable program code to issue the retry unmount command responsive to issuing at least one unmount command to each one of the plurality of file servers.

* * * * *